United States Patent [19]
Braun et al.

[11] Patent Number: 5,106,339
[45] Date of Patent: Apr. 21, 1992

[54] MOISTURE MONITOR SYSTEM AND METHOD FOR COMBINE HARVESTER

[75] Inventors: Keith Braun, Northwood; Larry Stille, Rockford, both of Iowa

[73] Assignee: David Manufacturing Company, Mason City, Iowa

[21] Appl. No.: 758,708

[22] Filed: Sep. 9, 1991

Related U.S. Application Data

[63] Continuation of Ser. No. 479,096, Feb. 12, 1990.

[51] Int. Cl.⁵ .................................................... A01F 12/00
[52] U.S. Cl. ...................................... 460/7; 56/DIG. 2; 56/10.2
[58] Field of Search .................. 460/7, 1, 118, 97, 902; 56/10.2, DIG. 2, DIG. 15

[56] References Cited

U.S. PATENT DOCUMENTS

| | | | |
|---|---|---|---|
| 2,670,845 | 3/1954 | Busack et al. | |
| 2,858,620 | 11/1958 | Naylor | |
| 3,271,878 | 9/1966 | Martin | |
| 3,373,871 | 3/1968 | Huether | |
| 3,400,468 | 9/1968 | Mathews | |
| 3,404,467 | 10/1968 | Burghard | |
| 3,429,053 | 2/1969 | Behlen et al. | |
| 3,470,626 | 10/1969 | Pfeiffer | |
| 3,606,745 | 9/1971 | Girodat | |
| 3,636,638 | 1/1972 | Noyes | 34/174 |
| 3,703,802 | 11/1972 | Wrestler et al. | 56/13.3 |
| 3,714,718 | 2/1973 | Sukup | 34/56 |
| 3,736,667 | 6/1973 | McClaren | 34/56 |
| 3,765,100 | 10/1973 | Heidtmann | 34/45 |
| 3,946,496 | 3/1976 | Sukup | 34/56 |
| 4,068,223 | 1/1978 | Steffen | 56/10.2 |
| 4,152,840 | 5/1979 | Stille | 34/56 |
| 4,168,466 | 9/1979 | Boldt | 324/61 R |
| 4,208,858 | 6/1980 | Rowland-Hill | 56/14.6 |
| 4,284,086 | 8/1981 | Williams | |
| 4,296,409 | 10/1981 | Whitaker et al. | 56/10.2 |
| 4,376,298 | 3/1983 | Sokol et al. | 460/1 |
| 4,403,191 | 9/1983 | Satake | 324/61 R |
| 4,425,937 | 7/1985 | Strandberg, Jr. et al. | 34/48 |
| 4,509,273 | 4/1985 | Roisen | 56/12.2 |
| 4,530,167 | 7/1985 | Hotovy | 34/47 |
| 4,546,725 | 10/1985 | Oetiker et al. | 324/61 R |
| 4,599,809 | 7/1986 | Parkes | 34/31 |
| 4,765,190 | 8/1988 | Strubbe | 56/DIG. 15 |
| 4,912,914 | 4/1990 | Wingard | 34/48 |
| 4,916,830 | 4/1990 | Braun et al. | 34/48 |

OTHER PUBLICATIONS

MCS/101 Brochure from Moisture Control Systems, Inc. undated.

MoistureTrac Brochure from Shivvers, Inc., undated, with accompanying letter from Shivvers dated Sep. 15, 1989.

American Society of Agricultural Engineers, Paper No. 85-3529 entitled "Acoustic Properties of Flowing Wheat", Andreas Harrenstein and Gerald H. Brueswitz, for presentation at the 1985 Winter Meeting dated Dec. 17-20, 1985.

The COMPU-DRY SYSTEM: Moisture Measuring and Control Equipment for Vertical Drying Plants, Eco-Line Products, Inc. (undated).

COMPU-DRY, Shivvers Brochure, copyright Jan. 1985.

Moisture Monitor System Instruction Manual, Moisture Control Systems, Inc. (undated).

MCS 201 New Generation Analog Moisture System, Moisture Control Systems, Inc. (undated).

(List continued on next page.)

*Primary Examiner*—Terry Lee Melius
*Attorney, Agent, or Firm*—Merchant, Gould, Smith, Edell, Welter & Schmidt

[57] ABSTRACT

A system and method of monitoring the moisture of grain as it is being harvested by a combine. The moisture of the grain is continuously measured as the grain is traveling through a clean grain auger of the combine. These moisture measurements are displayed to the combine operator in the cab of the combine. A multiprocessor is provided to sample and store the moisture measurements. The multiprocessor also averages the stored measurements so that the operator can obtain the average moisture content of grain harvested from operator-defined areas of a field.

24 Claims, 3 Drawing Sheets

OTHER PUBLICATIONS

MCS 401 MT Transducer Specifications, Moisture Control System, Inc. (undated).
MCS 401 8 Channel Monitor, Moisture Control Systems, Inc. (undated).
Auto Dry The Grain Brain, Sukup Brochure, (undated).
Gravity Pipe Sampling Concept Drawing, Moisture Control Systems, Inc. Jul. 31, 1979.
Bin Sampling Concept drawing, Moisture Control Systems, Inc. Jul. 30, 1979.
Direct Transducer Mounting Concept drawing, Moisture Control Systems, Inc. Aug. 6, 1979.
Auger Sampling Concept drawing, Moisture Control Systems, Inc. Jul. 30, 1979.

MOISTURE MONITOR SYSTEM AND METHOD FOR COMBINE HARVESTER

This is a continuation of application Ser. No. 07/479,096, filed Feb. 12, 1990.

BACKGROUND OF THE INVENTION

The present invention relates generally to the field of combining grains. More particularly, the present invention relates to a system and method for monitoring moisture of grain as it is being harvested by a combine harvester.

A combine harvester, often called a combine, is used by farmers to harvest grain. The combine cuts the grain growing in a field and separates the grain from the rest of the plant. Generally, a combine works by drawing the crop into the combine and using a system of rotors and grates to separate the grain from the rest of the plant, often called the chaff. A fan is used in the separation process to blow away the lighter chaff from the relatively heavy grain. The separated grain, often called clean grain, is collected in an auger and elevated by some means to a collection bin in the combine.

Generally, farmers wait until they believe a field has reached a certain level of ripeness or dryness and then combine the whole field. The clean grain which is collected in the bin of the combine is eventually transferred to trucks and taken to drying bins, on-farm storage, or directly to grain elevators. Where grain is taken first often depends on the moisture content of the grain. To properly store grain, it must be below a certain moisture content. Some harvested grain must be dried in a drying bin or the equivalent to lower the moisture content before it is stored. The moisture content of grain is also important because crop yield, and hence price, is a function of the volume and moisture of the grain.

The grain collected from any one field, or even any one row of one field, will not have a uniform moisture content because factors such as the soil, the elevation, the fertilizer spread, and the moisture of the soil, for example, are not uniform for a field or even a row. Thus, generally one of two scenarios follows: either all of the grain is dried, but some did not have to be; or none of the grain is dried, and some of it should have been. Both of these scenarios are problems. The former is a problem because of the additional expense and transfer costs associated with drying grain. The latter scenario is a problem because the stored grain may spoil if it has too high a moisture content. Thus there are advantages in knowing and keeping track of the moisture of the grain as it is being harvested by the combine.

A new, relatively high tech advancement in the agricultural industry involves using a grid system to plot out each field on paper. The grid system is used to keep track of different factors and conditions for each section of the grid, where each section corresponds to a certain area of the actual field. The factors include such things as soil type, soil moisture, plant density, amount of fertilizer spread, etc. The farmer maximizes the total crop by knowing and controlling the conditions of each section of the gridded field. Because moisture content is such an important factor, it would be very advantageous to be able to monitor and keep track of the moisture content of grain being harvested from any grid section of the field.

The prior art discloses many types of sensing systems for sensing the humidity or temperature of grain in a grain drying bin or in a test cell. Commonly assigned U.S. Pat. No. 4,916,830, discloses a grain dryer control system which uses a capacitive moisture sensor in the discharge auger to control the drying of the grain in the bin. However, the prior art does not disclose a system or method of continually sensing or keeping track of the moisture of the grain as it is being harvested by a combine. The present invention offers advantages over existing combining systems and methods.

SUMMARY OF THE INVENTION

The present invention relates to a moisture monitoring system and method for a combine harvester of the type which includes a clean grain auger. The moisture monitoring system includes a sensor assembly positioned in a clean grain auger for sensing the moisture content of grain moving through the auger. The operation of the moisture monitoring system is controlled by a multiprocessor.

Display means can be connected to the moisture monitoring system for displaying the moisture of the grain flowing through the clean grain auger. Additionally, the multiprocessor can sample the moisture readings and average them over a selectable, period of time.

There are several important advantages which flow from continually monitoring the moisture of the grain as it is being harvested. As mentioned, the moisture of the grain being harvested will vary not only from field to field but within a field and even within a row of a crop. By knowing the moisture content of the grain being harvested, the farmer can make appropriate adjustments. For example, the farmer could decide that the crop is not ready to be harvested at all or the farmer could decide that certain fields are not at the optimum ripeness, or that certain portions of a field are not at the optimum ripeness.

Furthermore, several of the optimum settings on the combine for settings such as the cylinder speed, fan speed, or header speed, are dependent on the moisture of the grain being harvested. If the farmer knows the moisture, the combine settings can be chosen without the usual guess work. Additionally, the farmer will know whether the grain is dry enough to be put directly to storage or whether it needs to be transferred to a drying bin. Also, as the moisture content is one of the factors used by the grain elevators to determine the price they will pay for the grain, having an independent means for verifying the moisture content is an important advantage to the farmer. Furthermore, as discussed above, knowing and keeping track of the moisture content of grain being harvested from any certain area of a field or farm allows the farmer to use this important factor in the new grid system, or the equivalent, being used by more and more farmers.

BRIEF DESCRIPTION OF THE DRAWINGS

In the drawings, in which like reference numerals and letters indicate corresponding parts throughout the several views.

DETAILED DESCRIPTION OF A PREFERRED EMBODIMENT

A typical combine harvester to which the present invention may be advantageously applied is shown in U.S. Pat. No. 4,208,858 to Rowland-Hill. The general structure and operation of a combine harvester will be described with reference to FIGS. 1 and 2 of U.S. Pat. No. 4,208,858. Header 13 cuts and gathers the crop and elevator 14 transports the crop upwards into the crop handling unit 15. The crop enters infeed auger 46 and moves in a longitudinal direction into rotors 24. Threshing of the crop takes place as it is pressed against threshing concaves 52. The grain that is removed by this threshing action passes through the grates of 52 and falls on grain pan 35. The rest of the crop material, the chaff, which does not fall through the grates, is discharged to the back of the combine and goes through straw or beater assembly 40. The grain that falls onto grain pan 35 is conveyed rearwardly through the combine by means of a shaking motion and eventually falls onto and through sieves 36 and 37, shown in FIG. 2 of U.S. Pat. No. 4,208,858. As grain is falling through sieves 36 and 37, cleaning fan 38 blows away additional chaff, which is lighter than the grain. As shown in FIG. 2, the grain passing through sieves 36 and 37 land on chute 74 which permits the grain to gravitate down into clean grain auger 75 which is located in trough 79 of the combine. Auger 75 laterally transfers the grain to the vertically rising grain elevator 32, shown in FIG. 1. Grain elevator 32 elevates the grain from grain auger 75 into grain tank 34.

The combine harvester shown in U.S. Pat. No. 4,208,858 and briefly described above, is a typical combine harvester. However, different combine harvesters have somewhat different systems for separating the grain from the rest of the crop and for transporting the grain to the grain bin. It is to be understood that the present invention may be applied to any combine harvester that includes at least one clean grain auger.

Figure 1:
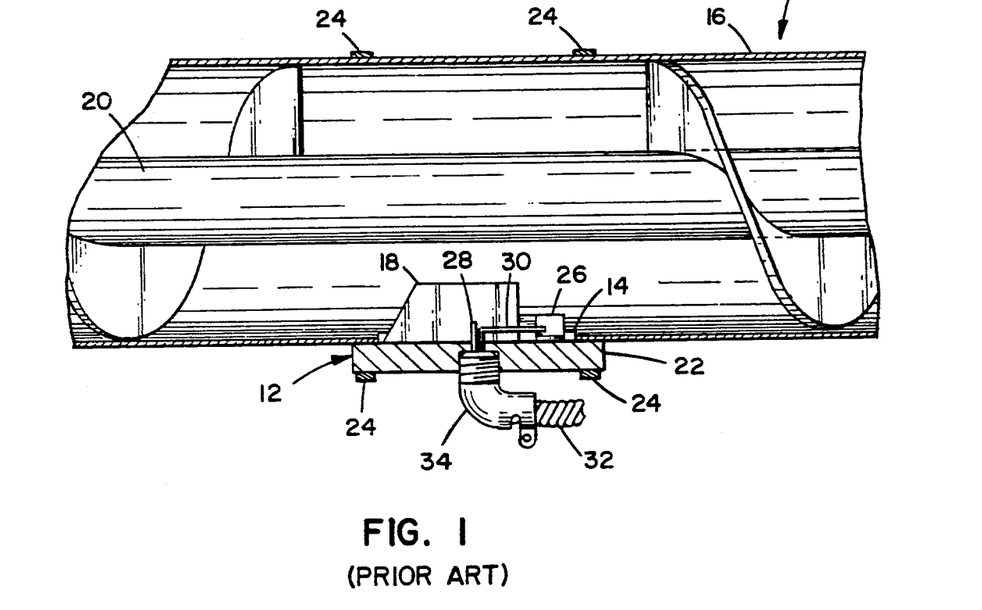
FIG. 1 is a sectional view illustrating prior art positioning of an embodiment of a sensor blade in an auger assembly.

In the preferred embodiment of the present invention, a moisture sensor is located in a clean grain auger such as that shown by reference numeral 75 in FIG. 2 of U.S. Pat. No. 4,208,858. The particular sensor used and its location within the auger as well as the circuitry for processing the sensor signals is the same as shown in commonly assigned U.S. Pat. No. 4,916,830, which is incorporated herein by reference as if repeated in full. FIG. 1 shows a sectional view of auger assembly 10 and the location of the sensor assembly 12 therein. As shown in FIG. 1, slot 14 is provided in the underside of the wall of auger tube 16. Auger tube 16 would correspond to trough 79 as shown in FIG. 1 of U.S. Pat. No. 4,208,858. The long extension of slot 14 is aligned with the axis of tube 16. A moisture sensor blade member 18 of sensor assembly 12 is mounted in tube 16 so that blade 18 extends through slot 14 into the interior of tube 16. A gap is provided in the flighting of auger 20. Auger 20 would correspond to auger 75 as shown in FIG. 2 of U.S. Pat. No. 4,208,858. The gap is provided in the flighting of auger 20 in order to provide a clearance for sensor blade 18 which is a substantially flat piece of metal extending longitudinally of tube 16. The gap is provided by removing a portion of the flighting from auger 20.

Figure 2:
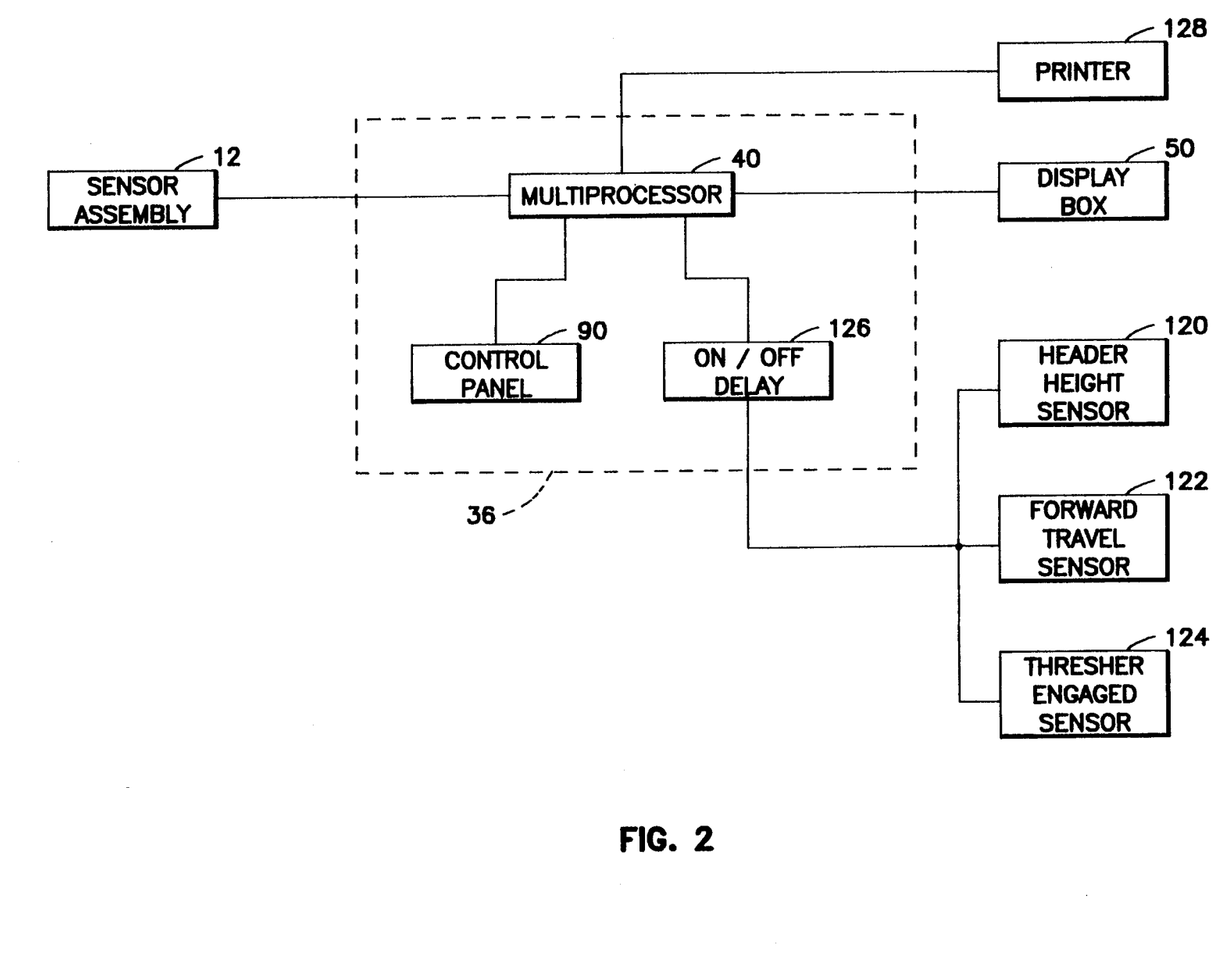
FIG. 2 is a block diagram of the moisture monitoring system in accordance with the principles of the present invention.

The moisture sensor blade 18, also referred to as a moisture contact member or a vane member, is suitably mounted on tube 16 by a member 22 and suitably fastened thereto by straps 24, or the like. Temperature sensor blade 26 is also mounted on tube 16 by member 22. The moisture sensor blade 18 and temperature sensor blade 26 are interconnected by electrical conductors 28 and 30, respectively, to sensor circuitry 38, which is located in sensor assembly 12 but not shown in FIG. 1. FIG. 2 shows a block diagram of computer housing 36. The preferred location of computer housing 36 in cab 60 of the combine is show in FIG. 5. The location of computer housing 36 shown in FIG. 5 makes it easy for the operator of the combine to reach control panel 90 of computer housing 36 when the operator is operating the combine. The conductors 28 and 30 are shown enclosed in conduit 32 so as to protect them from the elements and elbow fitting 34 connects conduit 32 to member 22.

In the preferred embodiment of the present invention, sensor assembly 12 senses the moisture content and temperature of the grain passing through tube 16 in the same manner as disclosed in U.S. Pat. No. 4,916,830. Sensor blades 18 and 26 and sensor circuitry 38 produce electrical signals representing the moisture content and temperature of the grain. The details of sensor circuitry 38 are as shown in FIGS. 3-6 of U.S. Pat. No. 4,916,830, with the exception of the frequency used. In U.S. Pat. No. 4,916,830, the four megahertz output of the crystal oscillator in FIG. 3 of that application was divided to produce an output of a one megahertz signal. In the present invention, a sixteen megahertz crystal oscillator is provided and then divided to produce an output of four megahertz. The moisture content of grain being harvested varies widely. The four megahertz frequency provides more consistent readings over a wider range of moisture contents of the grain being harvested than the one megahertz frequency.

Figure 3:
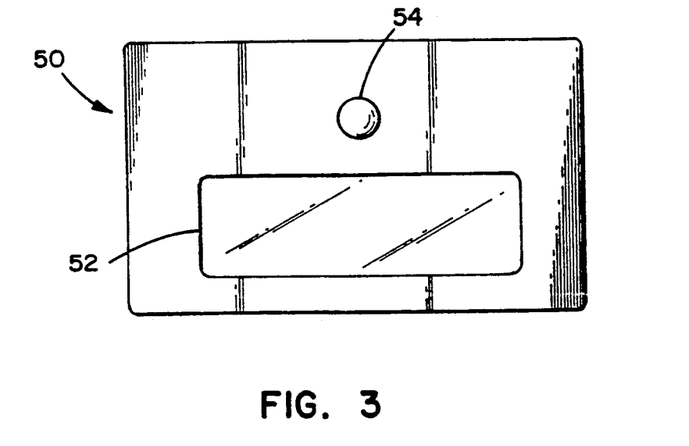
FIG. 3 is a plan view of a display panel of a display box in accordance with the principles of the present invention.
Figure 5:
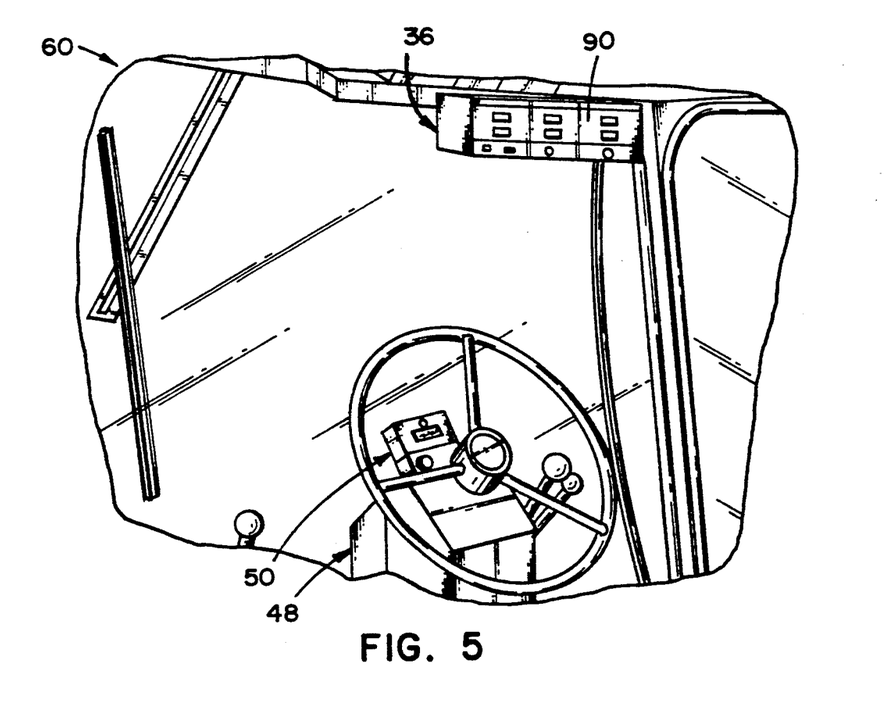
FIG. 5 is a cutaway view of the inside of the cab portion of a combine harvester illustrating the positioning of the display box and the computer housing in accordance with the principles of the present invention.

As explained fully in U.S. Pat. No. 4,916,830, sensor circuitry 38 and sensor blades 18 and 26 function together to determine the moisture content and temperature of the grain flowing through tube 16. In the present invention, sensor assembly 12, which includes sensor circuitry 38, is electrically connected to multiprocessor 40 as shown in FIG. 2. Multiprocessor 40 is electrically connected to display box 50 which includes display panel 52. Multiprocessor 40 sends the moisture reading processed by sensor assembly 12 to display panel 52. In the preferred embodiment, display panel 52 is a lighted liquid crystal display so that it can be read in sunlight as well as relative darkness. Display panel 52 of display box 50 is shown in FIG. 3. The preferred location of display box 50 in cab 60 of the combine is shown in FIG. 5. This placement of display box 50 on steering column 48 of the combine allows the operator of the combine to continually monitor display panel 52 while the operator is watching the operation of the header of the combine. Display box 50 also includes light 54 which is lit whenever the moisture content of the grain moving through tube 16 exceeds a preset moisture content value.

Figure 4:
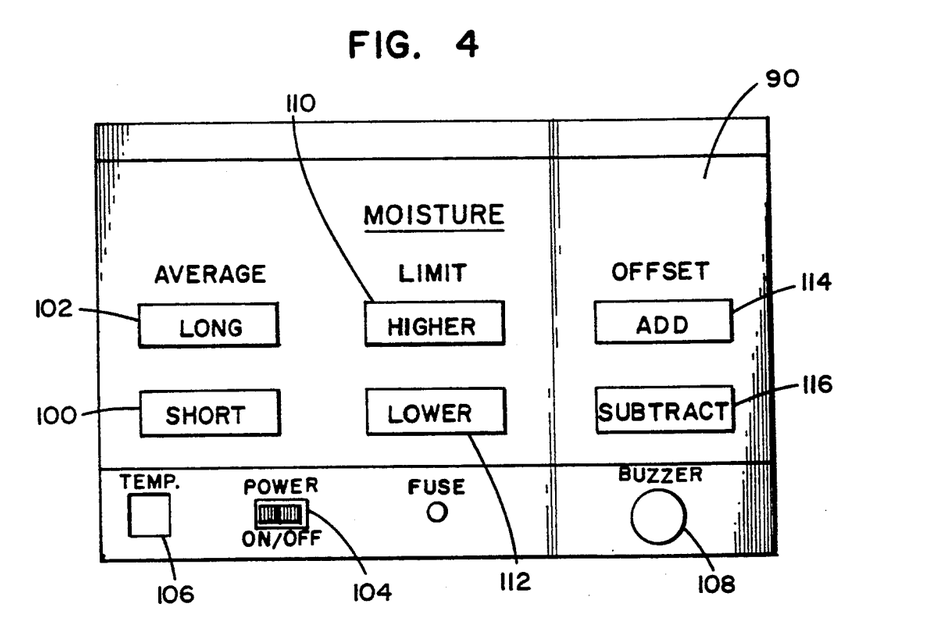
FIG. 4 is a plan view of a control panel of a computer housing in accordance with the principles of the present invention.

As shown in FIG. 2, multiprocessor 40 is provided to periodically sample the moisture content or temperature readings provided by sensor assembly 12 and calculate average moisture or temperature readings of the grain being harvested. Multiprocessor 40 stores these periodic readings in its memory for future reference. These stored readings can be printed out later, as will be explained below, or they can be stored in machine readable form on magnetic disks, or the like. Multiprocessor 40 can also average the sampled moisture readings over different, but overlapping, time intervals chosen by the combine operator. For instance, the operator can choose to have multiprocessor 40 average moisture readings over a short period of time, such as the time it takes the combine to make one trip across the field, at the same time it is averaging over a long period of time, such as the time it takes to harvest a certain number of acres or an entire field. The operator of the combine controls the averaging process and the display of the averages by depressing short average button 100 or long average button 102 on the control panel 90 of computer housing 36, as shown in FIG. 4. These buttons on control panel 90 are electrically connected to multiprocessor 40 as shown in FIG. 2. Further details of the averaging function of multiprocessor 40 will be explained below.

As shown in FIG. 2, three additional sensors are provided in the present invention to ensure that the averages calculated by multiprocessor 40 are as accurate as possible. Sensors 120, 122 and 124 are provided to stop the averaging process of multiprocessor 40 when there is no clean grain flowing through the clean grain auger for whatever reason. Header height sensor 120, is located on the header assembly of the combine, such as header assembly 13 as shown in U.S. Pat. No. 4,208,858. When the combine is turned at the end of a trip across the field, the header assembly is lifted. Sensor 120 provides an electrical signal to multiprocessor 40 to temporarily interrupt the averaging process until the header assembly is lowered again and threshing resumes. Forward travel sensor 122 is located on the drive train of the combine and provides an electrical signal to multiprocessor 40 when the combine is stopped, such as in the middle of the field for unloading or adjustments. Multiprocessor 40 again temporarily interrupts the averaging process when sensor 122 indicates that the combine is not moving forward. The third sensor, thresher engaged sensor 124, is located in the thresher clutch of the combine and provides an electrical signal to multiprocessor 40 to indicate that the thresher is not engaged, even though the combine engine may be running and the combine may be traveling forward. When multiprocessor 40 receives a signal from sensor 124, it temporarily interrupts its periodic sampling and averaging process.

As also shown in FIG. 2, sensors 120, 122, or 124 are electrically connected to multiprocessor 40 through on/off delay circuit 126. In the preferred embodiment, delay circuit 126 provides a 30 second delay for a signal passing from any of the sensors to multiprocessor 40. Delay circuit 126 is provided to offset the delay between the time that grain is taken into the combine and the time the grain passes through tube 16 and is sensed by sensor assembly 12. When any of sensors 120, 122, or 124 are activated, there is still grain in the combine being threshed because of this delay. Thus the signals being provided from sensor assembly 12 to multiprocessor 40 are still legitimate. Delaying the activation signal between sensors 120, 122, and 124 and multiprocessor 40 ensures that the moisture and temperature readings obtained from these legitimate moisture and temperature signals are still sampled and stored by multiprocessor 40. When any of sensors 120, 122, or 124 is deactivated, this signal is also delayed before it reaches multiprocessor 40. The time delay between when the crop is taken into the combine and when the moisture and temperature is sensed is also the reason this delay is needed. More specifically, for instance, when the header is lowered after turning at the end of the field thus deactivating header height sensor 120, it takes a certain amount of time for grain to actually be threshed and start flowing through tube 16. Thus, to ensure accurate averaging, delay circuit 126 ensures that moisture and temperature readings from sensor assembly 12 are not sampled during this time delay.

FIG. 5 also shows printer 128 electrically connected to multiprocessor 40. Printer 128 can be used to print out a variety of information from multiprocessor 40. For instance, the sampled moisture readings can be printed out for a certain field or location within a field. This gives the farmer an opportunity to study the variance of the moisture content of grain harvested in a field or within a section of a field. Printer 128 can also be used to print out the average moisture content for any length of time. Thus, a farmer can have a record of the average moisture content for the grain harvested from one field or a portion of a field, or a bin full of grain. Printer 128, can also print out a record of the temperature of the harvested grain sampled at periodic intervals or averaged over a long or short period of time. The operation of multiprocessor 40 in sampling, storing, and averaging moisture and temperature readings from sensor assembly 12 and the operation of printer 128 in printing these values are well known in the art.

Control panel 90 of computer housing 36 is shown in FIG. 4. The buttons on control panel 90 are electrically connected to sensor circuitry 38 in sensor assembly 12 and multiprocessor 40. Sensor assembly 12 and multiprocessor 40, which is located in computer housing 36, are turned on by pushing the on side of power on/off switch 104. When sensor assembly 12 and multiprocessor 40 are turned on, the moisture readings from sensor assembly 12 are shown on display panel 52 of display box 50, shown in FIG. 3. Sensor assembly 12 and multiprocessor 40 are turned off by pushing the off side of power on/off button 104 or by shutting off the combine engine.

As discussed above, temperature sensor blade 26, located in tube 16, is constantly sensing the temperature of the grain moving through tube 16. This temperature can be displayed at any time by the operator by pushing temperature button 106 on control panel 90. This causes the temperature derived by sensor assembly 12 from temperature sensor blade 26 to be displayed on display panel 52 temporarily for as long as temperature button 106 is depressed.

A preset moisture limit is programmed into multiprocessor 40 and anytime sensor assembly 12 senses a moisture content higher than this preset moisture limit, multiprocessor 40 causes light 54 on display box 50 to be lit and buzzer 108 on control panel 90 to buzz. Both light 54 and buzzer 108 alert the operator that the grain being harvested is more moist than the preset limit. The preset moisture limit value can be temporarily displayed on display panel 52 by pressing either higher limit button 110 or lower limit button 112 on control panel 90. The moisture limit value can be raised by the operator by holding in higher limit button 110 and can be lowered by the operator by holding in lower limit button 112.

Because of the variations between combines, including the clean grain auger size and speed, and the variations in the types of grain being harvested, multiprocessor 40 uses a moisture offset number to standardize the moisture reading produced by sensor circuitry 38 and displayed on display panel 52. Multiprocessor 40 uses the moisture offset number chosen by the combine operator to standardize the moisture readings in a similar manner to that used by the solid state components which performed this function in U.S. Pat. No. 4,916,830. More specifically, in U.S. Pat. No. 4,916,830, control panel moisture offset controls 112 and 113 are input to summing amplifier circuitry 110, as shown in FIG. 5A. As shown in FIG. 6A, the moisture offset control feature in U.S. Pat. No. 4,916,830 is implemented using the panel offset control potentiometer, operational amplifier U1 (with input 3), capacitor C4 and resistor R11. In the present invention, this same standardization adjustment is done instead by multiprocessor 40. In operation, the operator can temporarily display the moisture offset number on display panel 52 by pressing add offset button 114 or pressing subtract offset button 116. The operator can add to the moisture offset number by holding in add offset button 114 and can subtract from the moisture offset number used by multiprocessor 40 by holding in subtract offset button 116.

As explained above, long average button 102 can be used to average the moisture content of a large section of a field, the whole field, or a certain number of acres. Short average button 100 can be used instead to average the sampled moisture readings of grain combined in one trip across the field or in a test plot or a bin full of grain. Buttons 100 and 102 work in the same manner, but providing two buttons allows the combine operator to keep track of different averages, as will be explained below. Pressing and holding in button 100 resets the running average to 0 for the short averaging process. When button 100 is momentarily pressed, the average moisture content of the grain combined since the last time button 100 was reset is calculated by multiprocessor 40 and displayed on display panel 52. Button 102 works in the same manner.

In typical operation, the combine operator may reset both buttons 100 and 102 at time t1 when combining starts. After one trip across the grain field, at time t2, the operator may press button 100 to calculate and display the average moisture content of the grain combined during that one trip across the field (t2−t1). Button 100 is then reset. After a trip back across the field, at time t3, the operator can press button 100 again to display the average moisture of the grain combined in just that second trip across the field (t3−t2). If the operator was interested in knowing the average moisture content of all the grain harvested up to time t3, the operator could momentarily press button 102 to calculate and display the average moisture content for t3−t1. The operator can continue to momentarily press button 100, and afterwards reset button 100, to obtain averages for any specific area of the field. After a large section of a field or the whole field is combined, at time t4, the operator can use button 102 to calculate and display the average moisture content for that larger section or field (t4−t1) since button 102 has not been reset.

Printer 128 can be electrically connected to multiprocessor 40, as shown in FIG. 2, and conveniently located in cab 60, not shown. Printer 128 can also be located in a remote location, such as the operator's house, not shown in the drawings. If printer 128 is located in a remote location, multiprocessor 40 communicates with a multiprocessor at that remote location via radio waves in a manner well known in the art. Printer 128 then prints the readings fed to it by the multiprocessor at the remote location.

Displaying the moisture content of the grain being harvested and being able to calculate average moisture contents for fields or portions of fields provides many important advantages over the prior art. The moisture content of grain in a field or even a portion of a field is not uniform. Being able to continually monitor the moisture of the grain being harvested allows the operator of the combine harvester to optimize harvest results. For instance, if the operator starts harvesting a certain portion of the field, but finds that the grain is too moist, the operator can stop and let the grain dry more in the field before the operator attempts to harvest it again. Oftentimes, harvested grain is transported to a grain drying bin where it is dried to ensure that the moisture content is below a certain level. With the present invention, if the operator knows, by monitoring the continuous readings of grain moisture while the grain is being harvested, that the grain is sufficiently dry, the grain can be moved directly to storage rather than to a grain drying bin. This saves time and money. Furthermore, for optimum operation of a combine harvester, the combine should be adjusted to match the crop being harvested. A big factor in making the proper adjustments is the moisture content of grain that is to be harvested. Knowing that moisture as the grain is being harvested allows the operator to makes these adjustments to the combine with knowledge, rather than guesswork.

Having detailed records which show the moisture content, or the average moisture content, of grain harvested from certain areas or certain areas of fields, helps the farmer maximize profits and make several management decisions. Many farmers sell their grain directly to an elevator. The moisture content of the grain and the volume are used to determine the sales price of the grain. Thus, if the farmer has independent knowledge of the moisture content of the grain being sold, he is able to verify any readings done by the elevator and is better able to demand a fair price.

Additionally, in the past, a farmer would treat a whole field, or his whole farm, uniformly. For instance, the farmer would plant the same number of seeds per acre and spread the same amount of fertilizer and herbicides on all of his land. Lately, the agricultural industry has become much more technically sophisticated. It is being recognized that within any one farm, and even within any one field, conditions vary quite widely due to many factors, such as soil type or soil condition. Many farmers have started to use a grid system to separate their field or farm into grid sections. The farmers then treat each section accordingly. Farmers have started to use these types of grid systems to optimize, for every section of a field, the money and labor input versus the yield in grain of that section. For instance, one grid section may need more fertilizer or herbicides and another section may need more water. Having the detailed moisture content records for each of these grid sections is another important factor for the farmer in making better management decisions. For instance, a farmer can determine that he will use one seed variety rather than another in a certain section based on the moisture content of grain harvested from that field section. Detailed moisture readings can also help a farmer to decide the amount of seed to plant in that section or the water needed in that section. A detailed record of moisture readings for a grid section can also be used to determine how much fertilizer or herbicide that section needs during the next growing season.

While the preferred embodiment described uses capacitive means for sensing the moisture of the clean grain in the horizontal clean grain auger of a combine, such as auger 75 in U.S. Pat. No. 4,208,858, any suitable means for measuring the moisture content of the clean grain as it runs through the combine could be used. Furthermore, the moisture sensing means could be located in any of the clean grain augers on a combine, or indeed, in any location where clean grain is flowing past a sensor of some type.

It is to be understood, however, that even though numerous characteristics and advantages of the present invention have been set forth in the foregoing description, together with details of the structure and function of the invention, the disclosure is a illustrative only, and changes may be made in detail, especially in matters of shape, size and arrangement of parts within the principles of the invention to the full extent indicated by the broad general meaning of the terms in which the appended claims are expressed.

What is claimed is:

1. A moisture monitoring system for a combine harvester of the type which includes a clean grain auger, comprising:
   (a) moisture sensing means comprising a sensor assembly positioned in said clean grain auger for sensing the moisture content of grain flowing through said clean grain auger and generating continuous moisture readings; and
   (b) multiprocessor means connected to said moisture sensing means for receiving moisture readings from said moisture sensing means and controlling said moisture monitoring system, said multiprocessor means comprising,
      (i) sampling means for periodically sampling said continuous moisture readings;
      (ii) memory means for storing said sampled moisture readings; and
      (iii) averaging means for averaging said sampled moisture readings over at least one selectable time period.

2. A moisture monitoring system according to claim 1 further comprising display means connected to said multiprocessor means for displaying said moisture readings.

3. A moisture monitoring system according to claim 1, further comprising comparator means for comparing a moisture reading from said moisture sensing means to a predetermined moisture limit and for signalling multiprocessor means if said moisture reading is greater than said predetermined moisture limit.

4. A moisture monitoring system according to claim 3, further comprising warning means connected to said multiprocessor means for alerting an operator of said combine harvester that said moisture reading is greater than said predetermined moisture limit.

5. A moisture monitoring system according to claim 4, wherein said warning means includes an audio signal.

6. A moisture monitoring system according to claim 4, wherein said warning means includes a light.

7. A moisture monitoring system according to claim 1, wherein said moisture sensing means includes adjustable moisture offset potentiometer means for adjusting a moisture reading from said sensor assembly.

8. A moisture monitoring system according to claim 1, further comprising sensor means connected to said multiprocessor means for halting said averaging means when grain is not flowing through said clean grain auger.

9. A moisture monitoring system according to claim 1, further including printer means connected to said multiprocessor means for printing said stored sampled moisture readings.

10. A moisture monitoring system according to claim 1, wherein said moisture sensing means includes temperature compensation means for eliminating system variations due to temperatures different than a predetermined baseline temperature.

11. A moisture monitoring system according to claim 10, wherein said temperature compensation means includes temperature sensing means for determining the temperature of grain in said clean grain auger and a temperature converter and adder means for adding or subtracting a portion of a temperature signal from said temperature sensing means into a moisture summing amplifier.

12. A moisture monitoring system according to claim 11, wherein said temperature sensing means includes a sensor blade and an integrated circuit temperature sensor.

13. A moisture monitoring system according to claim 1, wherein said moisture sensing means includes first low pass filtration means for eliminating electrical noise.

14. A moisture monitoring system according to claim 1, wherein said moisture sensing means includes second low pass filtration means for averaging out short term variations in moisture readings from said sensor assembly.

15. A moisture monitoring system according to claim 1, wherein said moisture sensing means includes voltage regulator means interconnected to a power supply for providing a regulated voltage.

16. A moisture monitoring system according to claim 1, wherein said moisture sensing means includes crystal oscillator means for driving capacitor means.

17. A moisture monitoring system according to claim 16, wherein said capacitor means includes adjustable trimmer capacitor means providing an adjustable reference output and sensor capacitor means electrically interconnected to said sensor assembly mounted in said clean grain auger for providing an output representative of the grain moisture content, whereby the output of said trimmer capacitor means can be adjusted to match that of said sensor capacitor means when there is no grain present in said clean grain auger so as to provide a reference output.

18. A moisture monitoring system according to claim 17, wherein said moisture sensing means includes voltage amplifier means for amplifying the output of said trimmer capacitor means and said sensor capacitor means.

19. A method of monitoring the moisture of grain being harvested by a combine harvester, comprising the steps of:
   sensing the moisture of grain flowing through a clean grain auger of said combine harvester;
   generating continuous moisture readings;
   periodically accessing a sample of said continuous moisture readings with a multiprocessor;

storing said sampled moisture readings in a memory of said multiprocessor;

averaging said sampled moisture readings over a predetermined period of time with said multiprocessor; and storing said average in said memory of said multiprocessor.

20. A method of monitoring moisture according to claim 19, further comprising the step of printing said sampled moisture readings with a printer.

21. A method of monitoring moisture according to claim 19, further comprising the step of halting said averaging when grain is not flowing through said clean grain auger.

22. A method of monitoring moisture according to claim 19, further comprising the steps of:

displaying said moisture readings on a display panel located in said combine harvester; and displaying said average on said display panel.

23. A method of monitoring moisture according to claim 19, further comprising the step of printing said average on a printer.

24. A method of monitoring moisture according to claim 19 further comprising the steps of:

comparing said sensed moisture reading to a predetermined moisture limit; and alerting the operator of said combine harvester if said sensed moisture reading is greater than said predetermined moisture limit.

* * * * *